Sept. 5, 1939.   E. W. DAVIS   2,172,136
LUBRICATING APPARATUS
Filed Jan. 11, 1937   2 Sheets-Sheet 2
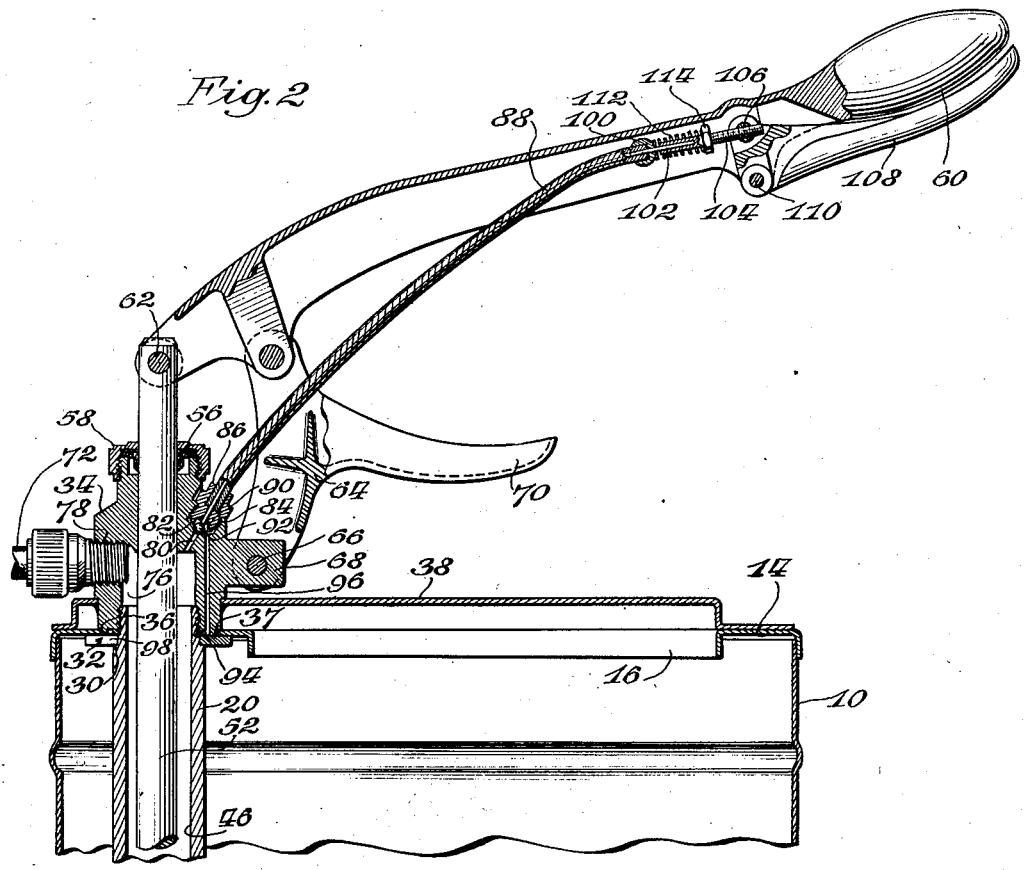
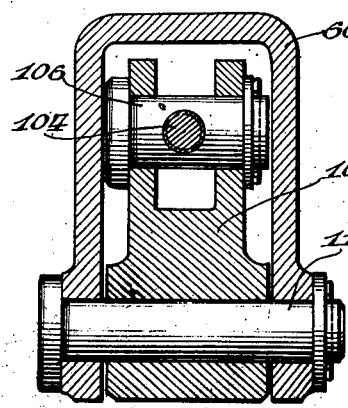
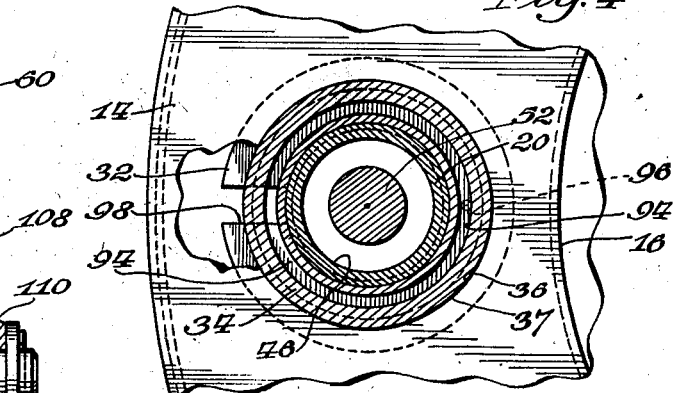
Inventor:
Ernest W. Davis
By Williams, Bradbury, McCaleb & Hinkle
Attys.

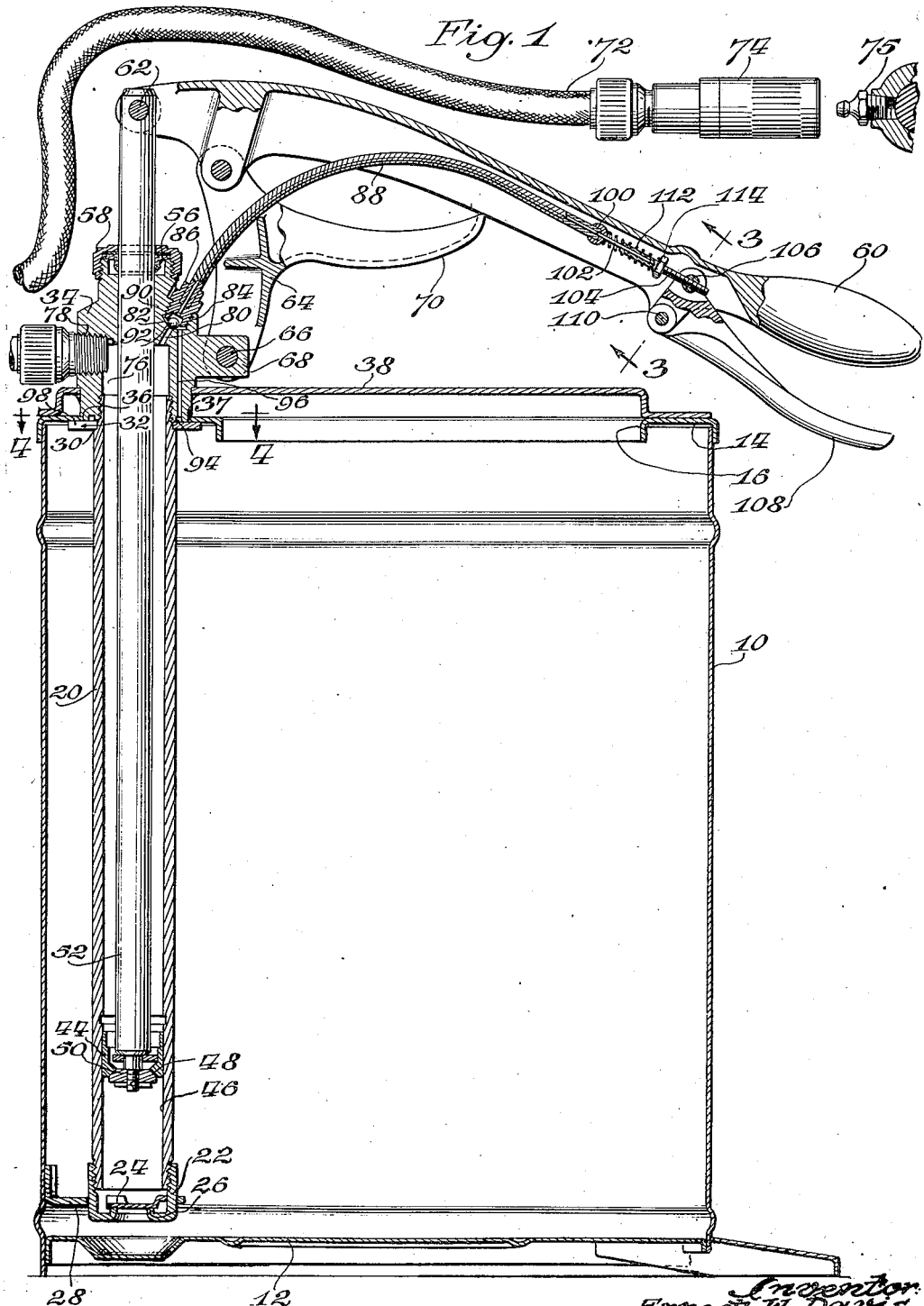

Patented Sept. 5, 1939

2,172,136

UNITED STATES PATENT OFFICE 2,172,136

LUBRICATING APPARATUS

Ernest W. Davis, Oak Park, Ill., assignor to Stewart-Warner Corporation, Chicago, Ill., a corporation of Virginia Application January 11, 1937, Serial No. 119,915

9 Claims. (Cl. 221—47.1)

My invention relates generally to lubricating apparatus, and more particularly to an improved lubricant compressor wherein means are provided automatically to relieve the pressure in the discharge conduit upon cessation of the operation of the compressor.

In lubricant compressors of the high pressure type provided with a discharge conduit and lubricant pressure operated coupling means, difficulty has been experienced in the past in relieving the pressure in the discharge conduit so as to enable the coupler easily to be disconnected from the fitting and to prevent oozing or dripping of the lubricant from the coupler after it has been disconnected from the fitting.

When a lubricant compressor of the general type herein disclosed is used for the lubrication of a relatively tight bearing, the pressure is maintained in the discharge conduit and coupler since the lubricant cannot flow into the bearing in the normal manner to relieve the pressure.

It is thus an object of my invention to provide a lubricant compressor having improved means for automatically relieving the pressure in the discharge hose and coupler connected to a lubricant compressor.

A further object is to provide a hand operated lubricant compressor with means for automatically relieving the pressure in the discharge conduit attached to the compressor whenever the operator releases the operating handle.

A further object is to provide hand operated lubricant compressors with means for lubricating the bearing on which the compressor can be swiveled with relation to the reservoir.

Other objects will appear from the following description, reference being had to the accompanying drawings, in which:

Fig. 1 is a central vertical cross sectional view through the compressor and tank;

Fig. 2 is a view of the upper portion of the compressor, similar to Fig. 1, showing he operating handle in elevated position and the relief valve closed;

Fig. 3 is a sectional view of the handle taken on the line 3—3 of Fig. 1; and

Fig. 4 is a sectional view of the pump head bearing taken on the line 4—4 of Fig. 1.

The compressor of my invention comprises a lubricant reservoir having a wall 10 which is elliptical in cross-section, a bottom wall 12, and a top wall 14 having an enlarged elliptical filling opening 16 formed therein. The walls of the reservoir are preferably of sheet metal and welded or otherwise suitably secured to each other. A sheet metal foot plate is welded or otherwise suitably secured to the lower edge of the wall 10 and to the bottom 12 of the reservoir.

The lubricant compressing mechanism comprises a pipe-like cylinder 20, the lower end of which has a foot valve cap 22 threaded thereon within which a foot valve 24 is retained for engagement with a seat 26. The foot valve cap 22 is guided for rotational movement in the aperture of a bracket 28 which may be welded or otherwise secured to the inside of the reservoir wall 10. The upper end of the compressor cylinder 20 has a shoulder 30 against which a washer 32 is clamped by the compressor head 34 which is screwed to the upper end of the cylinder 20. The lower end of the head 34 is provided with an annular groove 36 and loosely engages the edge of the top 14 surrounding the aperture therein through which the cylinder 20 projects, thereby forming a bearing 37 upon which the 20 compressor head can be swiveled. The compressor cylinder 20 and head 34 are thus freely rotatable with respect to the reservoir. A cover 38 is welded or otherwise rigidly secured to the head 34 and is adapted to cover the filling opening 16 formed in the top 14 of the reservoir.

A piston 44 is reciprocable in a cylindrical bore 46 formed at the lower end of the cylinder 20 and has a valve seat 48 formed about the opening in the bottom of the piston. A valve 50 carried by a piston rod 52 is adapted to engage the seat 48 upon the upstroke of the piston rod and to move away from said seat upon the downward stroke of the piston rod in a manner well known in compressor construction. The upper end of the piston rod 52 is sealed in its passage through the head 34 by a hat-shaped packing ring 56, held in place by a packing gland 58. The upper end of the piston rod is pivotally connected to the end of a handle 60 by a pivot pin 62, the handle being pivoted on a suitably formed link 64 which is pivotally mounted on a pin 66 which projects through a stud 68 on the head 34.

The link 64 has an arm 70 which projects substantially horizontally beneath the handle 60 and which serves as a handle by which the compressor may be carried. The end of the arm 70 engages the handle 60 on its downward movement, thereby limiting the downward stroke of the handle. The discharge conduit 72 leading from the compressor to a coupler 74, which in a lubricating operation is fitted to a lubricating fitting 75, communicates with the chamber 76 around the piston rod 52 through the tapped opening 78 formed within the head 34. Extending obliquely upward from the chamber 76 is a passageway 80 ending in a valve seat 82. Extending outwardly from the valve seat 82 is a tapped opening 84 which is closed by a bushing 86 at the end of a Bowden wire 88. This bushing 86 contains in its end a counter-bored chamber 90 in which is positioned a ball check valve 92, which normally rests upon the valve seat 82. The lower surface of the head 34 has a shallow annular groove 94 which communicates with the chamber 90 through a passageway 96. This groove 94 is covered by the washer 32 which is held against the lower surface of the pump head 34 in the manner previously described. The washer 32 has a slot 98, best shown in Fig. 4, through which the groove 94 communicates with the inside of the tank 10.

Near the end of the handle 60 is a pin 100 that anchors the casing of the Bowden wire 88 to the handle 60. From the pin 100 the actuating wire 102 extends outwardly and is fastened to a terminal screw 104 which is threaded to a pin 106. By means of this pivot pin 106, the wire 102 is pivotally connected with the pressure release control handle 108, the control handle 108 being pivotally connected with the operating handle 60 by means of a pivot pin 110. Between the pins 100 and 106 and surrounding the screw 104 is a coil spring 112 held in compression against the pin 100 by a nut 114 on the screw 104 so that the spring 112 when normally extended will pull the wire 102 outwardly, thereby forcing the handle 108 away from the handle 60 and pulling the inner end of the Bowden wire 102 away from the ball valve 92.

In prior constructions of the type described, there have been disadvantages arising from the fact that after a greasing operation it is difficult to remove the coupler 74 from the lubricant receiving fitting 75 because of the high pressure on the lubricant in the line 72. After the coupler 74 is disconnected from the fitting, lubricant is likely to drip from the coupler because of slight contraction of the hose 72 and because flexing the hose incidental to moving it to a different fitting squeezes some of the lubricant from the hose.

The present invention obviates this difficulty by releasing the pressure in the hose 72 before the coupling 74 is removed from the fitting 75 in the following manner:

After the coupler 74 is fastened to the fitting, the handle 60 is grasped with the fingers extending around the lever 108. Consequently, when the fingers grip the handle in a natural manner, the lever 108 will be squeezed against the handle 60. This squeezing of the handle 108 against the handle 60 causes the pin 106 and wire 102 to be moved toward the pump head 34. The other end of the wire 102 is projected into the valve chamber 90 and presses the ball check valve 92 against its seat 82.

As the lever 60 is raised and lowered, in the normal pumping operation, lubricant is forced through the conduit 72 and coupler 74 into the fitting 75 connected to the bearing to be lubricated. After sufficient lubricant has been supplied to the bearing, the handles 60 and 108 are released, thereby allowing the spring 112 to force the handles 60 and 108 apart and to pull the end of the wire 102 away from the ball check valve 92. Consequently, the grease under pressure in the conduit 72 and in the chamber 76 around the piston rod 52 forces the ball check valve 92 away from its seat 82, thereby allowing the lubricant to flow upwardly through the passage 80 and into the chamber 90. From here the lubricant flows downwardly through the passageway 96 and around the annular groove 94. From the groove 94 it flows downwardly to the tank 10 through the slot 98 in the washer 32, thereby greasing the bearing 37 on which the pump head 34 turns when opening the cover 38 and releasing the pressure in the chamber 76, hose 72, and coupler 74.

Since the pressure within the hose 72 has been relieved the coupler 74 may be easily removed from the fitting 75 and no lubricant will drip from the coupler.

While I have shown and described a preferred embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desired to secure by United States Letters Patent is:

1. In a high pressure lubricant compressor, the combination of lubricant pumping mechanism, a discharge conduit for said pumping mechanism, a two-part handle for operating said pumping mechanism, a passageway connecting the discharge conduit with said reservoir for relieving the pressure in the former, a valve operable to close said passageway, and means operated by one of the parts of said handle when moved with respect to the other part for holding said valve closed.

2. A high pressure lubricant compressor comprising a reservoir, a cylinder receiving lubricant from said reservoir, a piston reciprocable in said cylinder, a discharge conduit connected to said cylinder to receive lubrincant therefrom, a passageway connecting said cylinder adjacent said discharge conduit with said reservoir, a valve operable to close said passageway, a manually operable handle for reciprocating said piston, and means connected to said handle for closing said valve thereby to prevent the escape of lubricant from said cylinder through said passageway.

3. A high pressure lubricant compressor having a discharge conduit, and means for relieving the pressure in said discharge conduit comprising a vent passageway permitting escape of lubricant from said discharge conduit, a valve for controlling the flow of lubricant through said passageway opening in the direction of the escape flow through said passageway, manually operable means remote from said valve for controlling the operation thereof, and mechanical means for transmitting motion from said last named means to said valve.

4. A high pressure lubricant compressor comprising a lubricant pumping mechanism, a reservoir for supplying lubricant to said pumping mechanism, a discharge conduit connected to the outlet of said pumping mechanism, a handle for operating said pumping mechanism, said handle having a grip portion, a lever pivoted to said handle and lying adjacent said grip portion so as to be capable of being grasped in one hand with said grip portion, valve controlled means for relieving the pressure in the outlet of said pumping mechanism, and means connected with said lever for operating said valve.

5. In a high pressure lubricant compressor, the combination of a reservoir having a filling opening, a pumping mechanism mounted in said reservoir for pivotal movement in a bearing about an axis perpendicular to the plane of said opening, said bearing having a passageway connecting said reservoir and the pressure side of said pumping mechanism, a discharge conduit connected to the outlet of said pumping mechanism, and a manually controlled valve for optionally closing said passageway.

6. In a high pressure lubricant compressor, the combination of lubricant pumping mechanism, a discharge conduit for said pumping mechanism, a handle for operating said pumping mechanism, a passageway connecting the discharge conduit with said reservoir for relieving the pressure in the former, a valve operable to close said passageway, and means associated with said handle for holding said valve closed incidental to the operation of said compressor by means of said handle.

7. A high pressure lubricant compressor comprising a reservoir, a cylinder receiving lubricant from said reservoir, a valved piston reciprocable in said cylinder, a discharge conduit connected to the outlet end of said cylinder, a passageway connecting the outlet end of said cylinder with said reservoir, manually operable means for reciprocating said piston, and means carried by said manually operable means and operable independently of the reciprocation of said piston by said manually operable means for preventing at will the escape of lubricant from said cylinder through said passageway.

8. A lubricant compressor comprising a reservoir, a pump cylinder having a piston reciprocable therein, a handle operatively connected to said piston, a pressure release passageway connecting said cylinder and said reservoir, a valve for closing said pressure release passageway during a lubricating operation, a lever positioned near said pump handle and pivotally connected thereto and a Bowden wire having one end connected to said lever to be actuated thereby, the other end of said Bowden wire being operable to close said valve when said lever is moved to a position closely adjacent said handle.

9. A high pressure lubricant compressor comprising a reservoir, a pumping mechanism fed from said reservoir and having an outlet, a discharge conduit connected to the outlet of said pumping mechanism, means for operating said pumping mechanism, a member having a passageway connected to said outlet for venting the latter, a valve in said passageway normally opening under the pressure of lubricant supplied by said pumping mechanism, and means carried by said pump operating means for closing said valve at will.

ERNEST W. DAVIS.